C. F. McCOWN.
COOKER.
APPLICATION FILED FEB. 29, 1916.

1,213,772.

Patented Jan. 23, 1917.

Inventor
Charles F. McCown.
by Edward R. Stowe, Atty.

UNITED STATES PATENT OFFICE.

CHARLES F. McCOWN, OF LONG BEACH, CALIFORNIA, ASSIGNOR OF ONE-HALF TO JOHN S. STEELY, OF LOS ANGELES, CALIFORNIA.

COOKER.

1,213,772.  Specification of Letters Patent.  Patented Jan. 23, 1917.

Application filed February 29, 1916.  Serial No. 81,152.

*To all whom it may concern:*

Be it known that I, CHARLES F. McCOWN, a citizen of the United States, residing at Long Beach, in the county of Los Angeles and State of California, have invented new and useful Improvements in Cookers, of which the following is a specification.

This invention relates to a cooker adapted to be connected to the exhaust of an engine, and pertains especially to a cooker which may be attached to the exhaust of an internal combustion engine.

Upon long journeys taken by automobile parties, or on shorter ones where it is desirable to carry a lunch, a camp stove must be carried to provide means for heating lunch, or vessels suitable for heating over a camp fire. With such accessories when the camp is made, considerable time is lost in making the fire and heating the food.

It is an object of my invention to provide a cooker of compact form which may be set into operation before the automobile reaches the point where camp is to be made, and whereby when the camp is reached the food is heated or cooked and ready to be served.

It is another object of this invention to provide a cooker which may be connected to the exhaust of an engine, and be heated by the exhaust gases.

It is a further object of this invention to provide a cooker of such construction that a large proportion of the heat in the exhaust gases will be retained within the cooker so that the cooker will operate upon the principle of fireless cookers now in common use.

Figure 1:
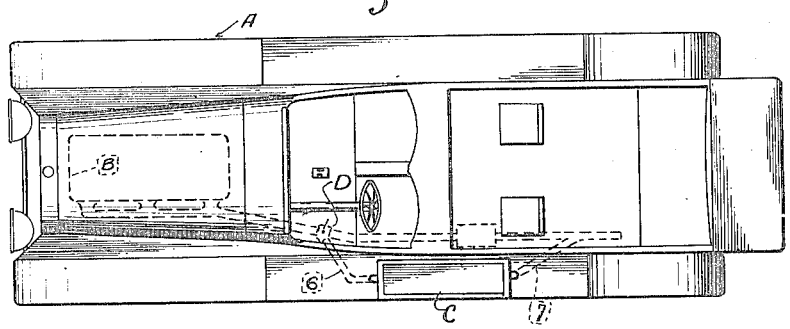
Figure 2:
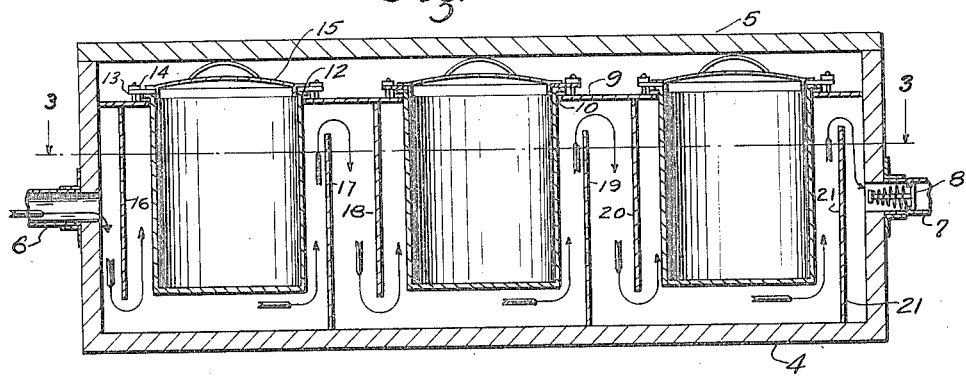
Figure 3:
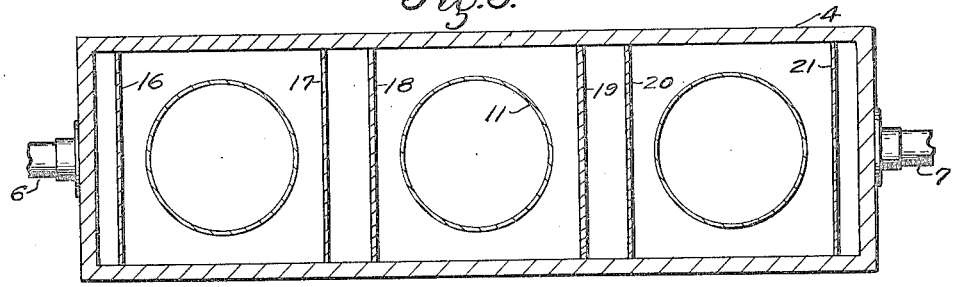

I have illustrated an embodiment of my invention in the accompanying drawing, in which:

Figure 1 is a plan view of an automobile with my cooker applied thereto. Fig. 2 is a vertical section through the cooker. Fig. 3 is a horizontal section as seen on the line 3—3 of Fig. 2.

More specifically, "A" indicates the body of an automobile of a well known type provided with foot boards and an engine "B" which is disposed beneath the hood at the forward end.

My improved cooker is indicated at "C," and is shown connected into the exhaust manifold of the engine so that in connection with the pipe it forms a by-pass controlled by a three-way valve "D." The cooker is shown disposed upon the foot board on the left hand side of the automobile, the latter being of the left hand type of drive. In this position the cooker is out of the way.

The cooker "C" is comprised of a casing 4, the walls thereof being preferably of some heat insulating material, or if desired packed with a heat insulator. A cover 5 is provided which may be hinged or detachable so that the receptacles containing the food to be heated and cooked may be conveniently placed therein or removed. Connected to the forward end of the casing 4 is an inlet pipe 6 which is connected to the three-way valve "D." The rear wall of the casing has connected thereto a discharge pipe 7 and is shown controlled by a low pressure valve 8. The pipe 7 is connected to the exhaust manifold to the rear of a three-way valve "D." Disposed within the casing 4 is a horizontal wall 9 having apertures 10 for receiving the cooking receptacles 11.

The receptacles are preferably of cylindrical form having at their upper edge outturned flanges 12 which are arranged to overhang the edges of the apertures 10. In order to provide a tight fit between the receptacles 11 and the wall 9, gaskets may be interposed between the flanges 12 and the wall. Rings 13 are placed upon the flanges 12 and secured to the wall 9 by means of bolts and nuts 14 so that when a receptacle 11 is placed in the aperture 10 and the gasket and ring 13 placed in position, the receptacles may be tightly secured to the wall 9 by means of the bolts and nuts 14. Covers 15 are provided for the receptacles 11, and the latter are preferably formed of heat conducting material so that the heat will be conveyed to the food or food containers disposed in the receptacles 11.

In order to insure a circulation of the hot exhaust gases around the receptacles 11, I have provided baffle plates 16, 17, 18, 19, 20 and 21 so that the gases follow a tortuous path passing from one end of the receptacles to the other. The baffle plates are preferably formed of heat retaining material, and are of such thickness that the amount of heat retained by them is comparatively great. These baffle plates in the receptacle also have the function of a muffler so that when the cooker is in operation the muffler may be cut out. The back pressure produced by the cooker is much less than produced by the mufflers now in common use.

On starting out with the automobile the food is placed in the receptacles 11. When the camping place is approached the three-way valve "D" is so turned that the exhaust gases will pass through pipe 6, the cooker "C" and the pipe 7 back into the exhaust pipe. The exhaust gases passing about the receptacles heat the latter and the food contained therein. At the same time the baffle plates are heated and sufficient heat is retained therein so that it will keep the food warm for sometime after the engine is stopped. It will also continue the cooking operation when the latter is desirable.

The cooker is easily cleaned by removing the receptacles 11 making the baffle plates accessible for purposes of cleaning and for the removal of soot or other material deposited therein. The receptacles 11 are also easily removable for the purpose of cleaning the matter in case food is placed directly in the receptacles. The low pressure valve 7 prevents too free a passage of the gases through the cooker, and retains the latter for a sufficient length of time to properly heat the receptacles.

It is obvious that my cooker may be applied to any heat engine such as an internal combustion or steam engine. When applied to an automobile no re-building of the automobile is required, the three-way valve "D" and the discharge pipe "C" being the only connections which are necessary to be made to the exhaust manifold. The cooker is compact and may be placed on the foot board on the side of the driver where the door is not used, in the rear, under the seat, or in any other convenient place.

I do not limit my invention to use with automobiles, as it may be used with any heat engine regardless of the purpose for which it is employed.

What I claim is:

1. In combination with the exhaust pipe of an engine, a cooker comprising a casing provided with an inlet connected to said pipe and an outlet, a wall in said casing having openings, cooking receptacles disposed in said openings, and extending into the path of the exhaust gases, baffle plates disposed in said casing transverse to the path of travel of exhaust gas therethrough and disposed between said receptacles.

2. In combination with the exhaust pipe of an engine, a cooker comprising a casing provided with an inlet connected to said pipe and an outlet, a wall in said casing having openings, cooking receptacles disposed in said openings and extending into the path of the exhaust gases, baffle plates of relatively high heat retentivity disposed in said casing transverse to the path of travel of exhaust gases therethrough and disposed between said receptacles.

In witness that I claim the foregoing I have hereunto subscribed my name this 25th day of January, 1916.

CHARLES F. McCOWN.

Witnesses:
 Ed H. Wallace,
 Grace Rennis.